July 20, 1926. 1,593,046
S. SUITS
MACHINE FOR CUTTING DESIGNS IN COMPRESSIBLE SHEET MATERIAL
Filed April 9, 1925    9 Sheets-Sheet 1

July 20, 1926. 1,593,046
S. SUITS
MACHINE FOR CUTTING DESIGNS IN COMPRESSIBLE SHEET MATERIAL
Filed April 9, 1925 9 Sheets-Sheet 5

Fig. 5.

July 20, 1926.  1,593,046
S. SUITS
MACHINE FOR CUTTING DESIGNS IN COMPRESSIBLE SHEET MATERIAL
Filed April 9, 1925  9 Sheets-Sheet 7

WITNESSES
Virgil L. Mares
George A. Gruss

INVENTOR
Seymour Suits
Joshua R. H. Potts
HIS ATTORNEY

S. SUITS 1,593,046

MACHINE FOR CUTTING DESIGNS IN COMPRESSIBLE SHEET MATERIAL

Filed April 9, 1925   9 Sheets-Sheet 9

WITNESSES:
Virgil L. Mares
George A. Gruss

INVENTOR
Seymour Suits.
BY Joshua R. H. Potts
HIS ATTORNEY

Patented July 20, 1926.

1,593,046

UNITED STATES PATENT OFFICE.

SEYMOUR SUITS, OF PHILADELPHIA, PENNSYLVANIA.

MACHINE FOR CUTTING DESIGNS IN COMPRESSIBLE SHEET MATERIAL.

Application filed April 9, 1925. Serial No. 21,757.

My invention relates to machines for cutting designs in the surface of compressible sheet material, particularly pile fabric.

The chief objections to the usual method are that the outline of the design is ragged, the surface of the design uneven; the speed of cutting is slow, and danger of cutting the design too deep and injuring the fabric is always present.

Other objections are that the rolls between which the fabric is fed and compressed, do not yield when the fabric is thickened, and cause strained or broken machine elements and costly delays in production; that the lint formed by the cut pile fibers, not being removed immediately, accumulated on the machine parts and required frequent cleaning which retarded production; and that design rolls of different sizes could not be used in the machine.

The objects of my invention are to provide a machine which will be free of the above objections and more especially to provide a machine which will cut designs with even surface and sharply defined outline, at high speed.

These objects, and other advantageous ends which will be described hereinafter, I attain in the following manner, reference being had to the accompanying drawings in which.

Figure 8:
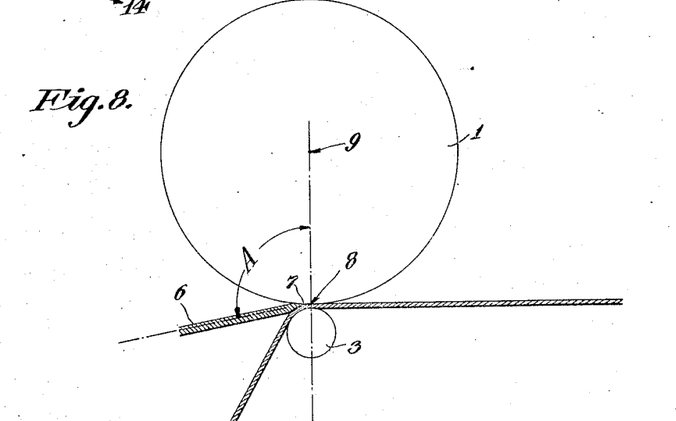
Figure 9:
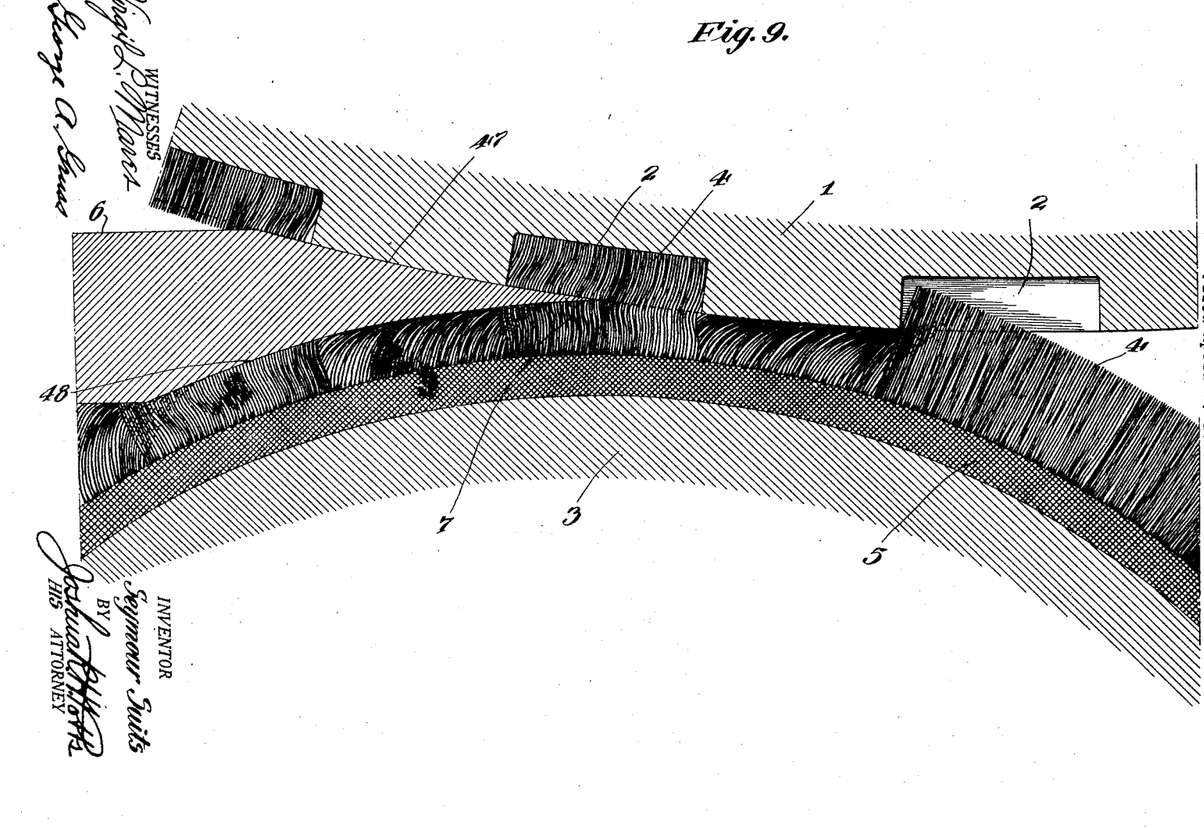

Referring to the drawings, particularly Figure 9, the main elements of the machine are a roll 1 having a design depression 2 in its face; a second roll 3 movably mounted beneath the design roll for pressing the upper ends 4 of the pile fibers of a pile fabric 5 into the design depression; and a band knife 6 having its edge 7 extending between the design roll and the fabric near the point of greatest compression for cutting the pile fibers, within the design depression, from the fabric, the knife being shown as disposed at an obtuse angle A to a plane passing through a point 8 of greatest compression and the center 9 of the design roll, as clearly shown in Figure 8. Owing to the knife being so disposed relatively to design roll 1, the pile fibers as they are cut, tend to cant the edge of the knife toward the design roll. This avoids the danger of the edge of the knife vibrating and cutting the design uneven and too deep.

Design roll 1 is adjustably mounted in the frame so that rolls of different sizes having designs of different sizes may be used in the machine. This adjustable mounting is preferably in the form of a yoke 10 having bearings 11 on its ends for supporting the ends of a shaft 12 fixed to the design roll. This yoke is mounted in guides 13 in the frame and is adjusted by screws 14 rotatably mounted in the yoke and threaded in the machine frame at 15. Play of the screw due to an inaccurate fit, is avoided by interposing compressible rubber blocks 16 between the yoke and the frame. These blocks tend to force the yoke and the design roll upward.

Design roll 1 receives its rotary movement from a driving gear 17 through an idler 18 and a driven gear 19 on the end of shaft 12. To allow adjustment of design roll 1 without affecting its gear connection, idler 18 is rotatably mounted on the end of a link 20, pivoted on a shaft 21 which carries gear 17, and the end of a link 22 pivoted on shaft 12 which carries the gear 19. This arrangement of links and idler keeps the idler in mesh with the driving gear 17 and driven gear 19 in any position to which the design roll may be adjusted. Shaft 21 has a detachable gear 23 meshing with a detachable gear 24 on a shaft 25. Gears 23 and 24 are changed to accord with the peripheral speed of the different sized design rolls. Shaft 25 may be driven by suitable means such as the gears, shafts and pulley shown. Shaft 25 is operatively connected for rotating pressing roll 3 at the same peripheral speed as the design roll 1. This connection is a pinion 26 on shaft 25 meshing with a gear 27 on a shaft 28 fixed to a driving roll 29 engaging roll 3. Roll 29 is coated with antifriction material 30, such as hard rubber, to prevent slipping between it and pressing roll 3.

Figures 10, 11, 12, 13:
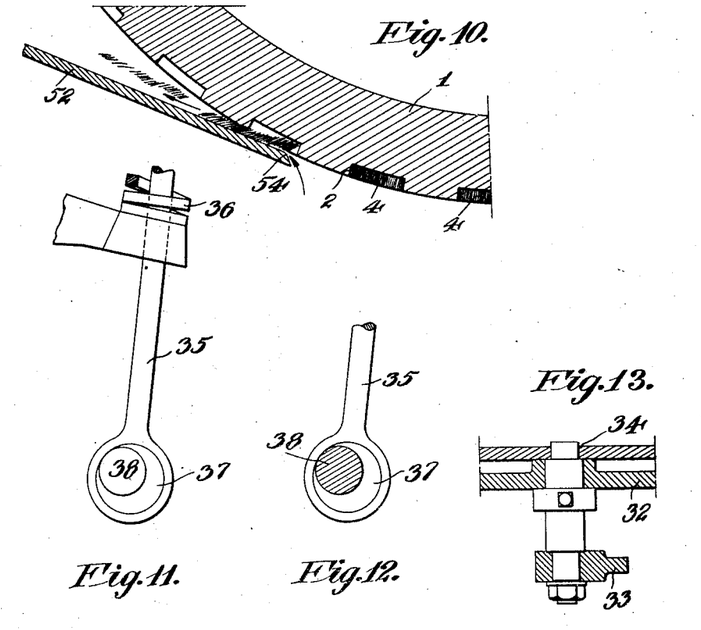
Figure 14:
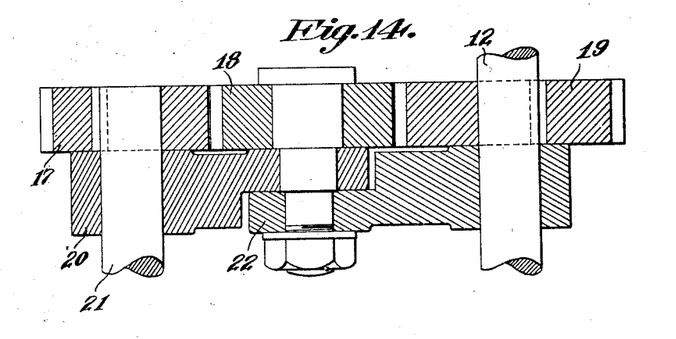

Pressing roll 3 is in the form of a heavy rod freely mounted to bear along its entire length against a guide 31 and is kept against the guide and the fabric by driving roll 29 adjustably mounted on the machine frame by a pair of levers 32, pivoted on brackets 33 as shown at 34 in Figure 13. One end of the levers rotatably carry driving roll 29 and the other end is connected with rods 35 through interposed springs 36. Rods 35 are connected to and moved by eccentrics 37 on a rock shaft 38 rockably mounted in suitable bearings on the frame, and adapted to be actuated by a lever 39.

A cradle 40 of any suitable construction supports the center of driving roll 29 to prevent sagging. This cradle is mounted on a pair of levers 41 pivoted at 42 in bearings 43 slidably mounted in guideways 44 and held in their normal position by springs 45 interposed between the bearings and the guideways. Levers 41 are swung on their pivots by eccentrics 46, similar to the eccentrics 37, on shaft 38. By swinging lever 39 and moving the parts connected therewith, driving roll 29 may be raised or lowered to cause roll 3 to press the fabric against the design roll or release the same. When roll 3 is in pressing position, springs 36 and 45 yieldably keep it in this position and allow fabric accidentally thickened by folding, doubling or foreign matter adhering thereto, to pass between the design and pressing rolls without straining the machine elements.

Knife 6 is in the form of a band and its edge is ground with a double bevel. The upper bevel 47 is ground to have a curvature substantially equal to the curvature of the design roll. The lower bevel 48 is ground to have a longer curvature than that of the upper bevel. The knife may be mounted on and moved and sharpened by any well known mechanism which has a pair of pulleys 49 for carrying the band, grinding wheels 50 for sharpening the band and jaws 51 for holding the knife in proper position.

The lint formed by the cut fibers is removed by a suction conduit 52 having its edges 53 abutting the face of the design roll and its lower edge 54 disposed near the knife so that the cut fibers packed in the design depression will not fall out before they reach the edge 54. The conduit may be suitably mounted and shaped to efficiently remove the lint.

Figure 1:
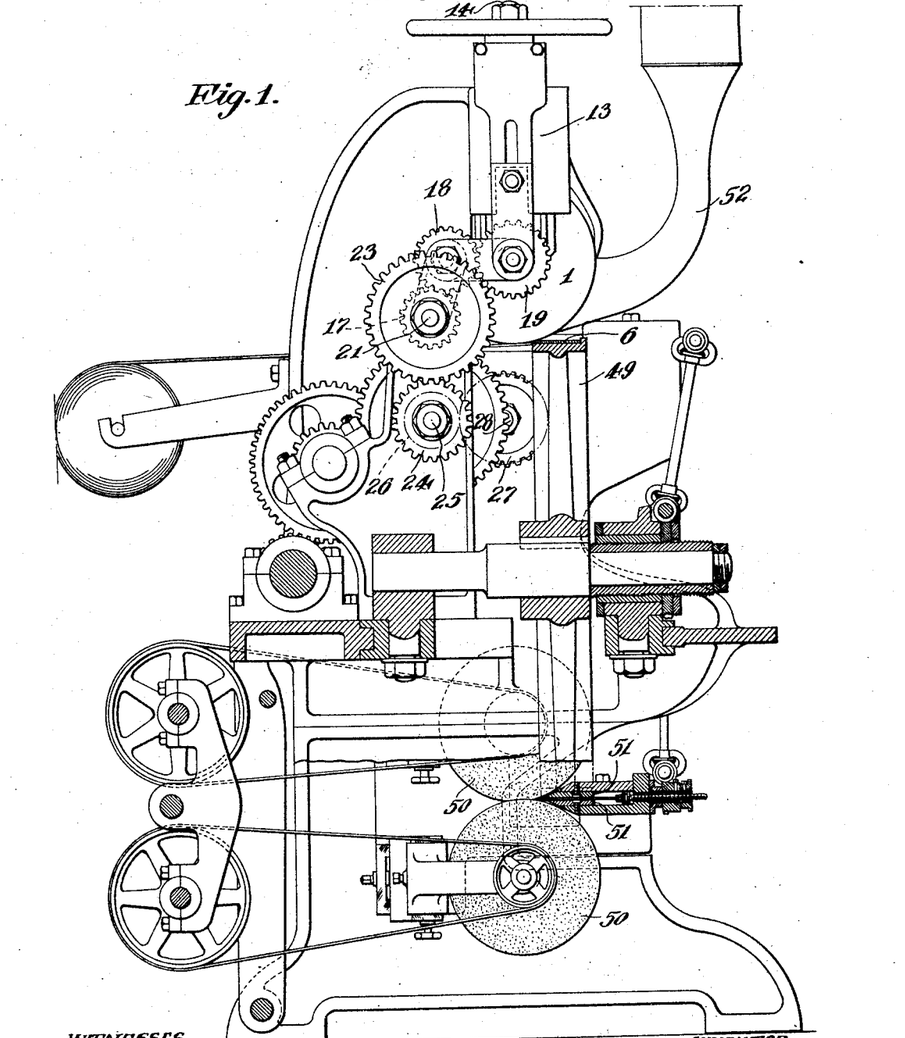
Figure 1 is an end elevation partly in section of a machine made in accordance with my invention, Figure 2 a side elevation, partly in section, looking from the left of the machine shown in Figure 1, Figure 3 a sectional plan taken on line 3—3 of Figure 2, Figure 4 an enlarged fragmentary section taken on line 4—4 of Figure 2, Figure 5 an enlarged view similar to Figure 4 showing the parts in another position, Figure 6 a section on line 6—6 of Figure 4, Figure 7 a fragmentary enlarged side view of elements forming part of my invention, Figure 8 a diagrammatic view of elements arranged in accordance with my invention, Figure 9 a fragmentary view greatly enlarged of elements forming a part of my invention illustrating their action on pile fabric, Figure 10 an enlarged section of elements forming a part of my invention illustrating the cleaning action on the design impressions, Figures 11 and 12 enlarged sections on lines 11—11 and 12—12 of Figure 2, Figure 13 a section on line 13—13 of Figure 5, and Figure 14 a section on line 14—14 of Figure 7.
Figure 2:
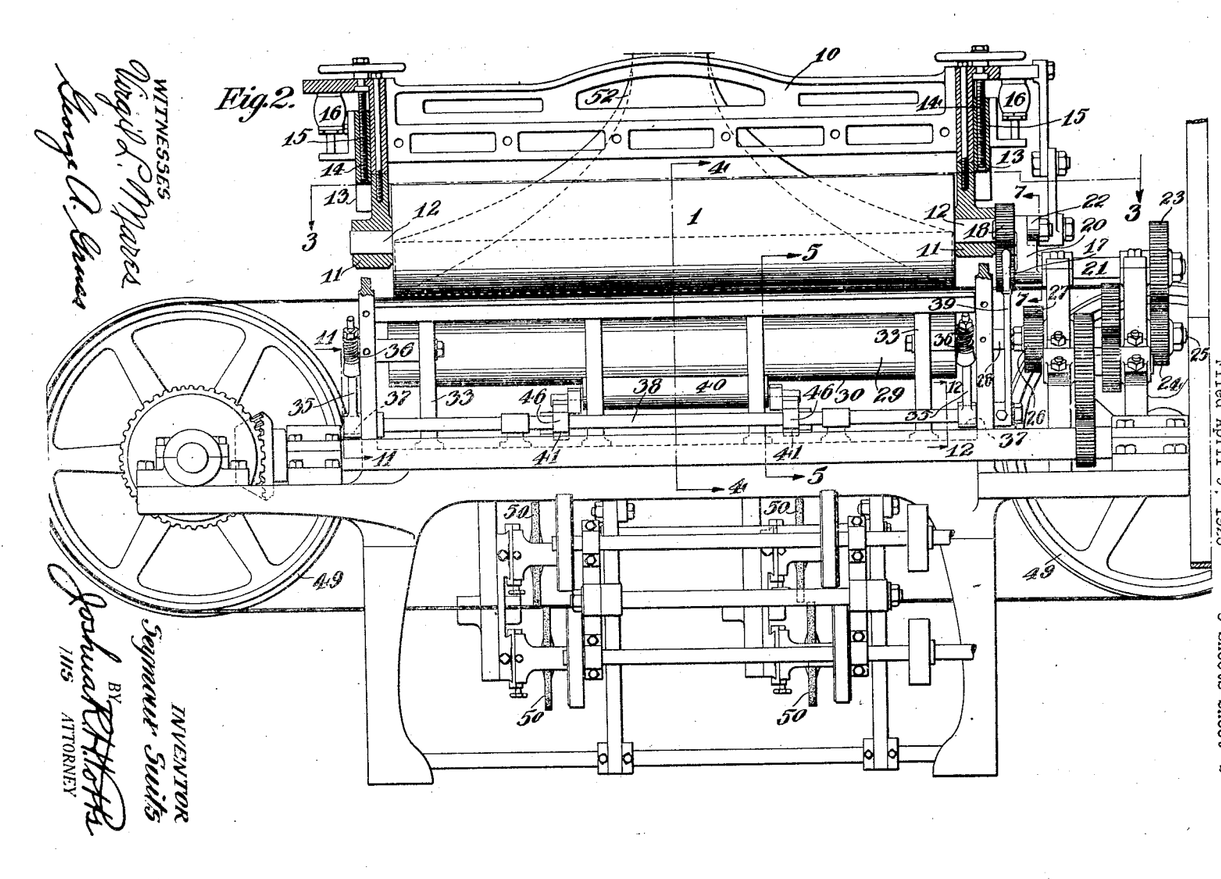
Figure 3:
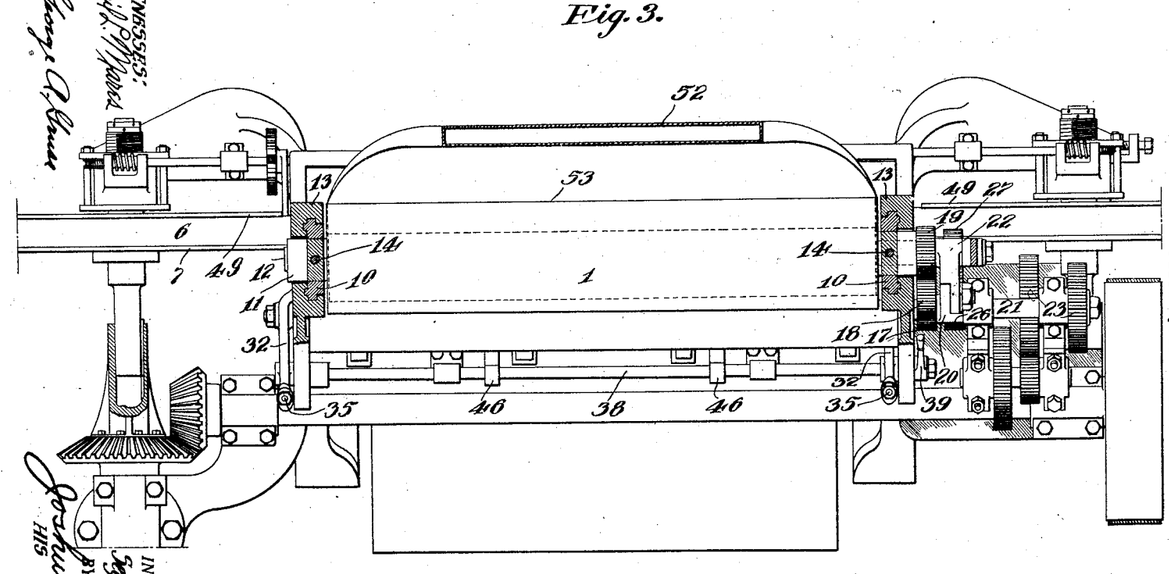
Figure 4:
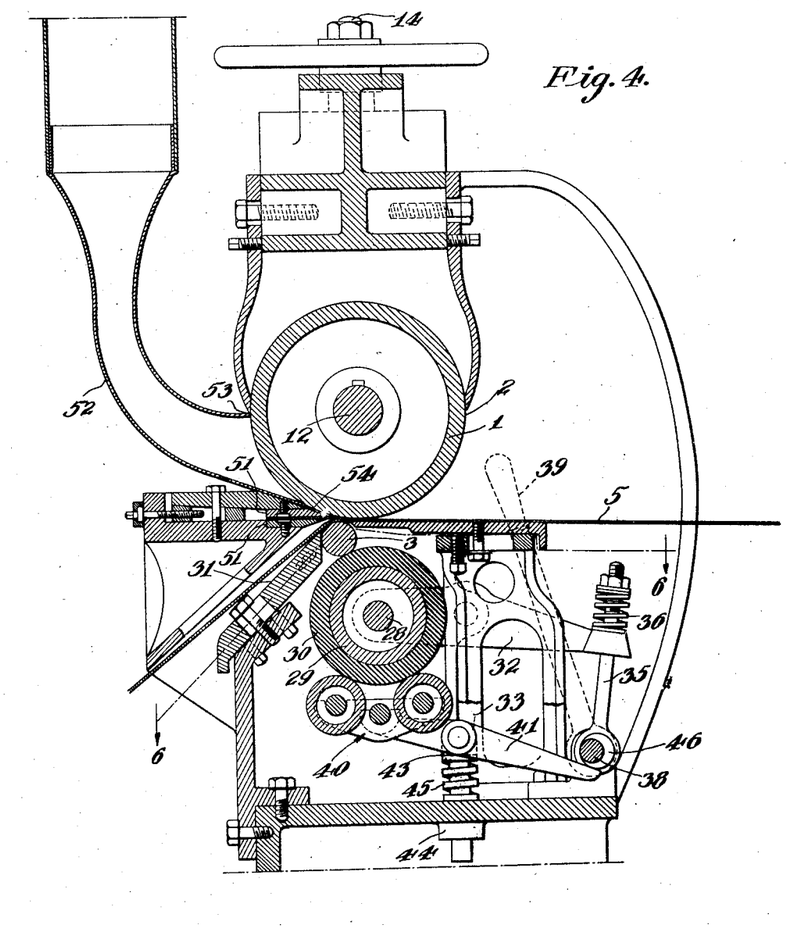
Figure 5:
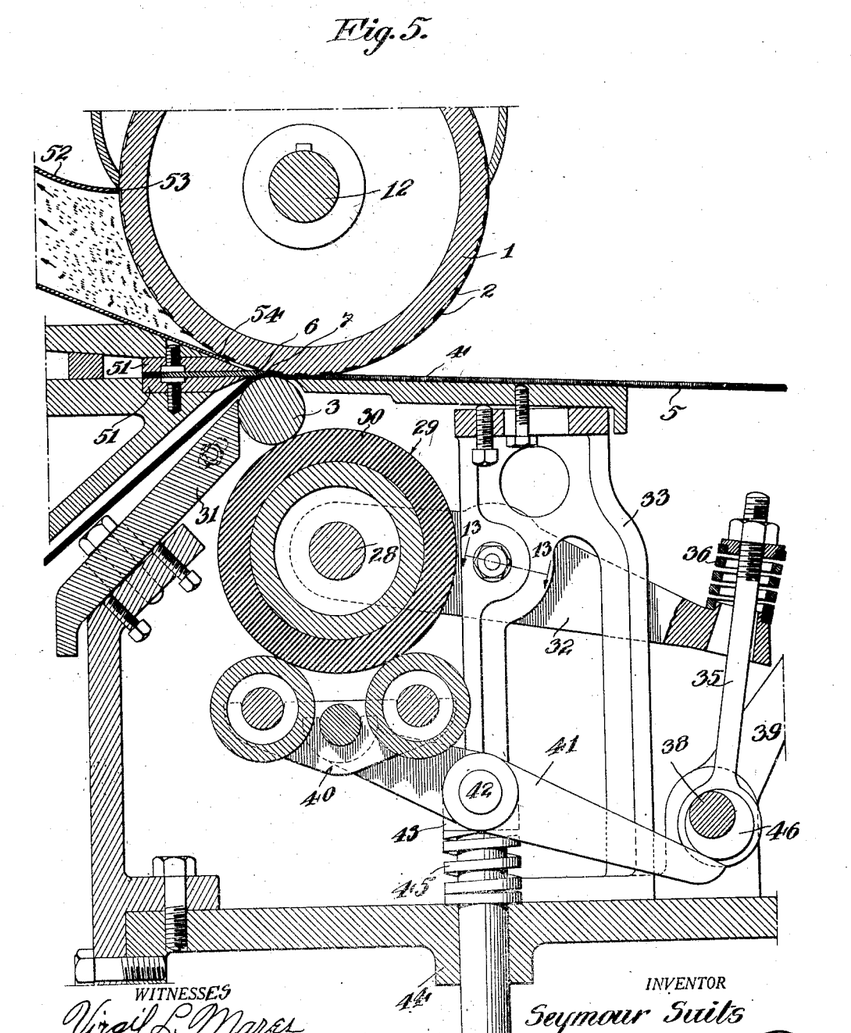
Figure 6:
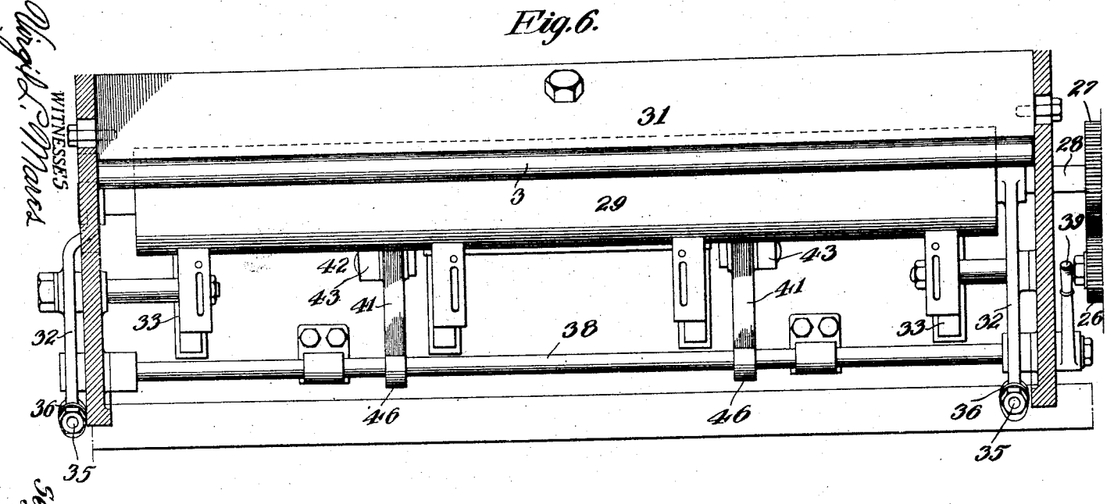
Figure 7:
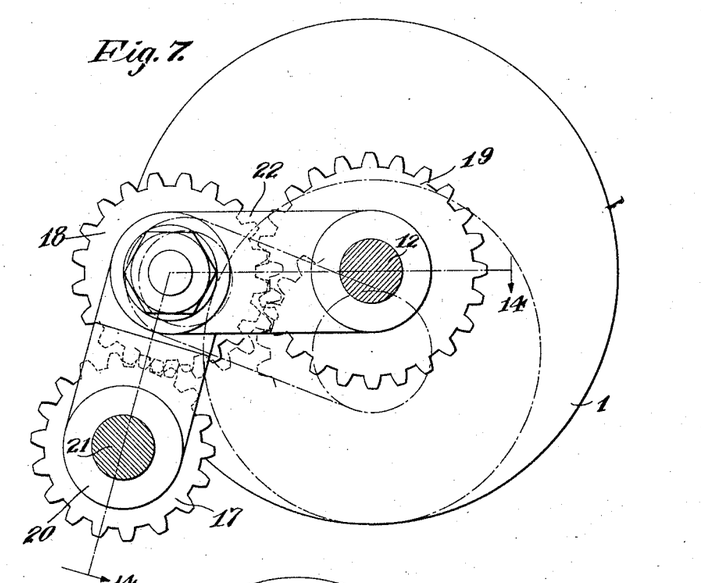

With the parts in the position shown in Figure 4, the fabric may be passed between design roll 1 and pressing roll 3, after which lever 39 may be swung to bring the pressing roll upward against the fabric. This action forces the upper ends of the pile fibers into the design depression as shown in Figure 5.

The fabric is now properly set in the machine and the machine is operated as follows:

Design roll 1 and pressing roll 3 are driven at equal peripheral speeds so that the fabric 5 is properly fed and compressed between the rolls. The design depression is of such depth as will slightly compress the pile fibers extending therein as shown in Figure 9. This prevents the backing of the fabric from being forced toward the design depression in the path of the knife and thus avoids the danger of cutting the backing. As the fabric is compressed and fed by the rolls, the edge 7 of the swiftly moving knife being near a point of greatest compression, cuts the slightly compressed pile fibers 4 extending within the design depression, and slides over the pile fibers not within the design depression. The knife being at an obtuse angle to a line passing from point 8 of greatest compression to the center 9 of the design roll, its edge will be kept adjacent the design roll; and the lower bevel of the knife having a large area and the compressed fibers sliding against this area, will assist in keeping the knife adjacent the design roll, thus preventing the knife from vibrating and working its way into the backing of the fabric. The cut pile fibers packed within the design depression are carried over the upper bevel of the knife and over the edge 54 of the air conduit. When the design depression 2 with the cut pile fibers therein is over the edge 54 it will form an air passage over the edge. The air as it is sucked through this passage carries with it the cut fibers as shown in Figures 5 and 10. The design depression is thus kept clean from the lint formed by the cut pile fibers. The fabric then passes out of the machine and its compressed uncut fibers return to their normal upright position above the cut fibers. The cut fibers form a design which has an even surface and a sharply defined outline.

Should the fabric become folded, doubled or thickened by foreign matter adhering thereto, as it passes between the design roll and the pressing roll, the pressing roll will yield to the increased thickness owing to springs 36 and 45, and thus avoid straining or breaking the machine elements.

When a design roll of different size is used, the toggle connection of idler 18 allows the roll to be adjusted without affecting its operative connection with the driving means.

By mounting the knife at an obtuse angle to a line passing from the point of greatest compression through the center of the design roll, providing a large surface on the lower bevel of the knife, and making the design depressions of such depth as to slightly compress the fibers, the edge of the knife is kept in one position adjacent the design roll and prevented from vibrating, and the backing of the fabric prevented from being pressed upward in the path of the knife, thus producing a cut-out design in pile fabric which has an even surface and a sharply defined outline, and allowing the machine to operate at high speed without danger of the knife vibrating or shifting from its position.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a machine of the character described, a roll having a design depression on its face; a roll for pressing a portion of the pile of a fabric into the depression, the depression being of such depth as to slightly compress the pile fibers extending therein, and a knife having its edge extending between the design roll and the fabric for cutting the slightly compressed pile fibers from the fabric.

2. In a machine of the character described, a roll having a design depression on its face; a roll for pressing a portion of the pile of a fabric into the depression; a guide; a driving roll engaging and keeping the pressing roll in position against the guide, and a band knife having its edge extending between the design roll and the fabric for cutting the portion within the depression from the fabric.

3. In a machine of the character described, a roll having a design depression on its face; a roll for pressing a portion of the pile of a fabric into the depression; a guide in contact with the entire length of the pressing roll; a driving roll engaging and keeping the pressing roll in position against the guide, and a band knife having its edge extending between the design roll and the fabric for cutting the portion within the depression from the fabric.

4. In a machine of the character described, a roll having a design depression on its face; a roll for pressing a portion of the pile of a fabric into the depression; a driving roll engaging and keeping the pressing roll in position; yieldable means supporting the driving roll, and a band knife having its edge extending between the design roll and the fabric for cutting the portion within the depression from the fabric.

5. In a machine of the character described, a roll having a design depression on its face; a roll for pressing a portion of the pile of a fabric into the depression; a driving roll engaging and keeping the pressing roll in position; yieldable means adjustably supporting the driving roll, and a band knife having its edge extending between the design roll and the fabric for cutting the portion within the depression from the fabric.

6. In a machine of the character described, a roll having a design depression on its face; a roll for pressing a portion of sheet material into the depression; arms pivoted on the machine; a driving roll on one end of the arms engaging and keeping the pressing roll in position; resilient means connected with the other end of the arms for yieldably keeping the driving roll against the pressing roll, and a knife having its edge extending between the design roll and the sheet material for cutting the portion within the depression from the sheet material.

7. In a machine of the character described, a roll having a design depression on its face; a roll for pressing a portion of sheet material into the depression; arms pivoted on the machine; a driving roll on one end of the arms engaging and keeping the pressing roll in position; rods passing through the other end of the arms; springs between the rods and the arms; means for moving the rods to compress the spring and yieldably keep the driving roll against the pressing roll, and a knife having its edge extending between the design roll and the sheet material for cutting the portion within the depression from the sheet material.

8. In a machine of the character described, a roll having a design depression on its face; a roll for pressing a portion of sheet material into the depression; a driving roll engaging and keeping the pressing roll in position; yieldable means supporting the driving roll; a knife having its edge extending between the design roll and the sheet material for cutting the portion within the depression from the sheet material; a cradle yieldably mounted on the frame and supporting the driving roll between its ends, and means for keeping the cradle against the driving roll.

9. In a machine of the character described, a roll having a design depression on its face; a roll for pressing a portion of sheet material into the depression; a driving roll engaging and keeping the pressing roll in position; yieldable means supporting the driving roll; a knife having its edge extending between the design roll and the sheet material for cutting the portion within the depression from the sheet material; a cradle bearing slidable in the machine; a spring between the bearing and the machine; a cradle, and means mounted on the bearing for keeping the cradle against the driving roll.

10. In a machine of the character described, a roll mounted for sliding adjustment and having a design depression on its face; driving means; means for transmitting movement from the driving means to the design roll, said means being flexible to allow adjustment of the design roll; a roll for pressing a portion of sheet material into the depression, and a knife having its edge extending between the design roll and the sheet material for cutting the portion within the depression from the sheet material.

11. In a machine of the character described, a roll mounted for sliding adjustment and having a design depression on its face; a driving gear; a link having one end pivoted concentrically to the driving gear; a driven gear carried by the design roll; a link having one end pivoted concentrically to the driven gear; an idler rotatably mounted in the other end of both links and meshing with the driving and driven gear; a roll for pressing a portion of sheet material into the depression, and a knife having its edge extending between the design roll and the sheet material for cutting the portion within the depression from the sheet material.

In testimony whereof I have signed my name to this specification.

SEYMOUR SUITS.